(12) United States Patent
Ikeda et al.

(10) Patent No.: US 10,196,307 B2
(45) Date of Patent: Feb. 5, 2019

(54) ADMIXTURE FOR HYDRAULIC COMPOSITION

(71) Applicant: SIKA TECHNOLOGY AG, Baar (CH)

(72) Inventors: Akira Ikeda, Sodegaura (JP); Susumu Hashizume, Sodegaura (JP); Akira Suga, Sodegaura (JP); Satoshi Kobayashi, Sodegaura (JP); Michael Wernher Danzinger, Zurich (CH); Kaname Saitoh, Hiratsuka (JP); Ikuhide Togami, Hiratsuka (JP)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 15/305,412

(22) PCT Filed: Apr. 24, 2015

(86) PCT No.: PCT/JP2015/062601
§ 371 (c)(1),
(2) Date: Oct. 20, 2016

(87) PCT Pub. No.: WO2015/163468
PCT Pub. Date: Oct. 29, 2015

(65) Prior Publication Data
US 2017/0044063 A1 Feb. 16, 2017

(30) Foreign Application Priority Data
Apr. 24, 2014 (JP) ................. 2014-090396

(51) Int. Cl.
| | | |
|---|---|---|
| *C04B 24/04* | (2006.01) | |
| *C04B 24/02* | (2006.01) | |
| *C04B 24/16* | (2006.01) | |
| *C04B 24/18* | (2006.01) | |
| *C04B 24/22* | (2006.01) | |
| *C04B 24/26* | (2006.01) | |
| *C04B 24/32* | (2006.01) | |
| *C04B 18/08* | (2006.01) | |
| *C08L 71/00* | (2006.01) | |
| *C04B 24/00* | (2006.01) | |
| *C04B 24/38* | (2006.01) | |
| *C04B 28/02* | (2006.01) | |

(52) U.S. Cl.
CPC ............ *C04B 24/045* (2013.01); *C04B 18/08* (2013.01); *C04B 24/00* (2013.01); *C04B 24/02* (2013.01); *C04B 24/16* (2013.01); *C04B 24/166* (2013.01); *C04B 24/18* (2013.01); *C04B 24/22* (2013.01); *C04B 24/26* (2013.01); *C04B 24/32* (2013.01); *C04B 24/383* (2013.01); *C04B 28/021* (2013.01); *C08L 71/00* (2013.01); *Y02W 30/92* (2015.05)

(58) Field of Classification Search
CPC ........ C04B 24/00; C04B 24/02; C04B 24/045; C04B 24/16; C04B 24/166; C04B 24/18; C04B 24/22; C04B 24/26; C04B 24/32; C04B 24/383; C04B 28/021; C04B 18/08; C08L 71/00
See application file for complete search history.

(56) References Cited

FOREIGN PATENT DOCUMENTS

| | | | |
|---|---|---|---|
| JP | S60-131855 | A | 7/1985 |
| JP | H05-24900 | A | 2/1993 |
| JP | H08-337449 | A | 12/1996 |
| JP | 2000-086311 | A | 3/2000 |
| JP | 2004-002172 | A | 1/2004 |
| JP | 2005-035872 | A | 2/2005 |
| JP | 2005-213082 | A | 8/2005 |
| JP | 2006-008456 | A | 1/2006 |
| JP | 2006-516529 | A | 7/2006 |
| JP | 2006-199953 | A | 8/2006 |
| JP | 2007-186396 | A | 7/2007 |
| JP | 2007-197261 | A | 8/2007 |
| WO | 2015/16346 9 | A1 * | 10/2015 ............. C04B 28/02 |

OTHER PUBLICATIONS

Jul. 14, 2015 International Search Report issued in International Patent Application No. PCT/JP2015/062601.
Dec. 11, 2017 Extended European Search Report issued in European Patent Application No. 15782949.0.
Apr. 27, 2018 Office Action issued in Chinese Patent Application No. 201580021373.X.

* cited by examiner

*Primary Examiner* — Anthony J Green
(74) *Attorney, Agent, or Firm* — Oliff PLC

(57) ABSTRACT

To provide a chemical agent whereby adjustment of air volume is easier, particularly in a hydraulic composition having fly ash blended therein. An admixture for a hydraulic composition, having a structure indicated by general formula (1) and including a carbon blocker including either one type of compound selected from a group comprising phosphate esters or at least two mixtures; and a water-reducing agent. (In the formula, $R^1$ indicates a hydrogen atom, an alkyl group, an alkenyl group, or a (meth)acryloyl group, $A^1O$ indicates a C2-3 oxyalkylene group, n indicates an average added molar number for the oxyalkylene group $A^1O$ of 2-150, m indicates an integer between 1 and 3, M indicates a hydrogen atom, an alkali metal atom, a group II metal atom, an ammonium group, or an organic ammonium group.)

6 Claims, No Drawings

ADMIXTURE FOR HYDRAULIC COMPOSITION

TECHNICAL FIELD

The present invention relates to a chemical agent for enhancing the air entraining performance of a hydraulic composition, such as a hydraulic composition that contains fly ash, thereby facilitating adjustment of air volume, and relates to a chemical agent that facilitates the volume of air entrained in a hydraulic composition having fly ash blended therein, regardless of fluctuations in the quantity of fly ash, as a particularly noteworthy aspect.

PRIOR ART

Air entraining agents (AE agents) are widely used as additives for increasing the fluidity of fresh concrete by allowing individual ultrafine air bubbles to be entrained in concrete, and enhancing the workability of fresh concrete and the resistance to frost damage of hardened concrete, and AE water-reducing agents that also exhibit a water-reducing effect and high performance AE water-reducing agents intended to improve the performance of such AE water-reducing agents have been marketed.

As the trend towards increased concrete durability has increased in recent years, proposals have been made for types of concrete in which ultrahigh strength is exhibited by reducing the quantity of water used in concrete. This type of ultrahigh strength concrete leads to the problem of fresh concrete increasing in viscosity due to a reduction in the quantity of water, and in order to solve this problem, hydraulic composition additives that exhibit an air entraining effect have been proposed in order to improve a viscosity-lowering effect, improve fluidity and achieve the effect of imparting stability to entrained bubbles (for example, see Patent Document 1).

In addition, there has been a tendency in recent years to actively use fly ash or fine blast furnace slag powder, which are industrial by-products, as a replacement for cement in concrete compositions in order to promote effective use of resources and reduce environmental load in the civil engineering and construction industry.

Of these, fly ash, which is recovered as ultrafine ash trapped by electrostatic precipitators from coal ash generated when coal is burned in thermal power stations, improves fluidity and workability when blended appropriately in concrete compositions, and is thought to enable an improvement in a variety of characteristics in concrete compositions and hardened concrete products, such as enhancing long-term strength, reducing drying shrinkage and suppressing cracking, and the use of fly ash is progressing.

SUMMARY OF THE INVENTION

Problem to be Solved by the Invention

Here, the properties of fly ash vary depending on the type of coal used and the state of combustion, and fly ash contains approximately 1-10% of carbon as unburned carbon components. It is known that this unburned carbon adsorbs anionic surfactants and the like, which are known air entraining agents, thereby significantly reducing the effect of air entraining agents. Therefore, it is necessary to significantly increase the quantity of air entraining agent used when fly ash is blended in concrete compared to cases in which ordinary concrete that does not contain fly ash is produced.

As a result, a number of methods for deactivating, or reducing the content of, unburned carbon contained in fly ash have been investigated in the past, for example a method for dimensionally stabilizing a ceramic product by adding a non-ionic surfactant to fly ash that contains unburned carbon, adsorbing the surfactant on the unburned carbon, and then using the adsorption-treated fly ash (see Patent Document 2), and a method for increasing the quality of fly ash by spraying a surfactant during a fly ash production step (see Patent Document 3).

In addition, in cases where fly ash is used, proposals have been made for a cement admixture obtained using a specific surfactant in order to reduce such effects (see Patent Document 4) and an admixture intended to ensure appropriate air entrainment properties by blending three specific components, such as salts of graft copolymers having specific structures, at prescribed proportions (see Patent Document 5). However, in methods proposed thus far, because the content of unburned carbon fluctuates greatly if there are fluctuations in the content or type of fly ash in fly ash-containing concrete compositions in particular, it is not easy to adjust the air volume using conventional air entraining agents.

Therefore, there is a need for development of auxiliary agents which do not interfere with the action of an air entraining agent and which enhance this action even if fly ash is present, and, for example, a sacrificial agent for fly ash concrete comprising a substance that preferentially interacts with fly ash components has been proposed (see Patent Document 6). However, the content of unburned carbon varies greatly according to the usage quantity and type of fly ash, as mentioned above, and it is difficult to ensure a constant air volume across such fluctuations even in the invention disclosed in Patent Document 6, and further improvements are therefore necessary.

With the problems mentioned above in mind, the inventors of the present invention set themselves the problem of providing a chemical agent with which it is possible to maintain the air volume in concrete within a narrow range of fluctuation without greatly varying the added quantity of an air entraining agent (AE agent) in a hydraulic composition, and especially a hydraulic composition having fly ash blended therein, even if the quantity of fly ash blended in cement varies, in other words, a chemical agent which could facilitate adjustment of air volume.

Means for Solving the Problem

As a result of diligent research, the inventors of the present invention found that an admixture obtained by combining a water-reducing agent with a phosphate ester compound of a polyalkylene glycol used as a chemical agent (a carbon blocker) for blocking interference of air entraining effects by unburnt carbon could maintain fluctuations in air volume within a narrow range of fluctuation even in cases where, for example, the proportion of fly ash blended in cement varies, and could facilitate adjustment of air volume in a fly ash-containing concrete composition in particular, and thereby completed the present invention.

That is, the present invention relates to an admixture for a hydraulic composition, which contains a carbon blocker including one type of compound selected from among the group consisting of phosphate monoesters and salts thereof, phosphate diesters and salts thereof and phosphate triesters and salts thereof, each of which has a structure represented by general formula (1), or a mixture of two or more types thereof; and a water-reducing agent.

[Chemical Formula 1]

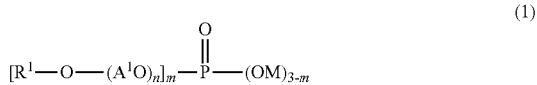
(1)

$R^1$ denotes a hydrogen atom, an alkyl group having 1-5 carbon atoms, an alkenyl group having 2-5 carbon atoms or a (meth)acryloyl group, $A^1O$ denotes an oxyalkylene group having 2-3 carbon atoms, n denotes the average number of added moles of the oxyalkylene group $A^1O$, and is 2-150, m denotes an integer between 1 and 3, and M denotes a hydrogen atom, an alkali metal atom, a group II metal atom, an ammonium group, or an organic ammonium group.)

The admixture for a hydraulic composition of the present invention can further contain a glycol ether having a structure represented by formula (2).

[Chemical Formula 2]

(in the formula, $R^2$ denotes an alkyl group having 1-5 carbon atoms or an alkenyl group having 2-5 carbon atoms, $A^2O$ denotes an oxyalkylene group having 2-3 carbon atoms, and p denotes the average number of added moles of the oxyalkylene group $A^2O$, and is 2-150.)

In the present invention, it is preferable for the water-reducing agent to include at least one type selected from among the group consisting of lignin sulfonic acid-based water-reducing agents, polycarboxylic acid-based water-reducing agents and naphthalene sulfonic acid-based water-reducing agents.

In addition, the admixture for a hydraulic composition of the present invention may further contain an anti-foaming agent or an air entraining agent.

Furthermore, the admixture for a hydraulic composition of the present invention is preferably an admixture for a hydraulic composition having fly ash blended therein.

Effect of the Invention

By being blended in a fly ash-containing concrete composition, the admixture for a hydraulic composition of the present invention can maintain the air volume of concrete within a narrow range of fluctuation without greatly varying the added quantity of an air entraining agent, even if the quantity of fly ash blended in cement varies, for example, if approximately 30% of the total mass of cement is replaced by fly ash.

For example, by using an AE agent at a quantity of approximately 0.004-0.030 mass % relative to the mass of cement in a concrete composition that does not contain fly ash, the desired concrete air volume can be achieved. Meanwhile, in order to achieve the desired concrete air volume in a concrete composition in which approximately 30% of the total mass of cement is replaced by fly ash, the usage quantity of an AE agent must be greatly increased relative to the total mass of powder (cement and fly ash), for example to 0.014-0.110 mass %, depending on the type and quality of fly ash used. By using the admixture for a hydraulic composition of the present invention in order to address this problem, the usage quantity of an AE agent required in order to achieve the desired concrete air volume can be reduced to approximately 0.003-0.050 mass % relative to the total mass of powder (cement and fly ash), that is, the usage quantity of an AE agent can be reduced to approximately one half to one fifth of conventional usage quantities. In addition, because the admixture for a hydraulic composition of the present invention can achieve a desired concrete air volume at a broadly similar AE agent usage quantity regardless of whether or not fly ash is present in the concrete and regardless of the type of fly ash used, it is possible to significantly improve AE agent usage quantity adjustment operations, which were complicated in the past depending on whether fly ash was, or was not, present.

In addition, the admixture for a hydraulic composition of the present invention can be used not only for type I to type IV fly ash specified in JIS A6201 as types of fly ash for concrete, but also for fly ash not specified by JIS and crude fly ash powder, that is, the admixture for a hydraulic composition of the present invention achieves the effect of enhancing air entrainment in concrete compositions containing various types of fly ash, such as those that are, and are not, specified by JIS.

In addition, even when blended in a hydraulic composition that contains fly ash, the admixture for a hydraulic composition of the present invention can allow the inherent dispersion performance and slump retaining performance of a water-reducing agent to be satisfactorily exhibited due to the action of the carbon blocker contained in the admixture. That is, in a hydraulic composition that contains fly ash, the overall effect of a water-reducing agent, whose performance such as slump retaining properties had been impaired, can be improved.

Therefore, the admixture for a hydraulic composition of the present invention achieves the effect of being able to facilitate adjustment of air volume in fly ash-containing concrete compositions in particular.

In addition, because the admixture for a hydraulic composition of the present invention exhibits excellent compatibility between the carbon blocker contained in the admixture and a water-reducing agent (a cement dispersing agent) and excellent compatibility between an anti-foaming agent and an air entraining agent, it is possible to provide an admixture which does not separate even after having been stored for a long time after being formulated as a single liquid, which can be used without the individual components of the admixture separating when introduced on location, and which exhibits excellent one-pack stability.

MODE FOR CARRYING OUT THE INVENTION

Admixture for Hydraulic Composition

The present invention is an admixture for a hydraulic composition, and more specifically an admixture for a hydraulic composition, which contains a carbon blocker (CB) and a water-reducing agent.

The admixture of the present invention is a type of additive for a hydraulic composition, which achieves, as a particularly noteworthy effect, the effect of facilitating control of air volume by an air entraining agent (AE agent) in a hydraulic composition such as a fly ash-containing cement composition even if the type and content of fly ash or the like in a cement vary.

<Carbon Blocker>

The carbon blocker used in the present invention includes one type of compound selected from among the group consisting of phosphate monoesters and salts thereof, phosphate diesters and salts thereof and phosphate triesters and salts thereof, each of which has a structure represented by formula (1) below, or a mixture of two or more types thereof.

Moreover, in the present invention, carbon blocker means a chemical agent that is adsorbed on unburned carbon contained in fly ash preferentially over other chemical agents, thereby blocking adsorption of other chemical agents, such as air entraining agents, on unburned carbon, that is, a chemical agent that exhibits the effect of blocking interference of air entraining effects by unburnt carbon.

[Chemical Formula 3]

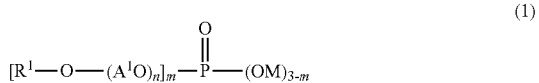
(1)

In the formula above, $R^1$ denotes a hydrogen atom, an alkyl group having 1-5 carbon atoms, an alkenyl group having 2-5 carbon atoms or a (meth)acryloyl group. Moreover, in the present specification, (meth)acryloyl group means an acryloyl group or methacryloyl group. Examples of these alkyl groups include methyl groups, ethyl groups, n-propyl groups, i-propyl groups, cyclopropyl groups, n-butyl groups, i-butyl groups, sec-butyl groups, tert-butyl groups, cyclobutyl groups, n-pentyl groups, 1-methylbutyl groups, 2-methylbutyl groups, 1-ethylpropyl groups, 1,1-dimethylpropyl groups, 1,2-dimethylpropyl groups, 2,2-dimethylpropyl groups and cyclopentyl groups.

In addition, examples of these alkenyl groups include vinyl groups, allyl groups, butenyl groups and pentenyl groups.

In the formula above, $A^1O$ denotes a hydrogen atom or an oxyalkylene group having 2-3 carbon atoms, that is, an oxyethylene group or an oxypropylene group.

In addition, n denotes the average number of added moles of the oxyalkylene group $A^1O$, and is 2-150. Of these, the value of n is preferably 2-50, more preferably 2-30, and particularly preferably 2-10, in order to reduce the degree of change in usage quantity of an air entraining agent, as mentioned below, even in cases where the degree of replacement of cement by fly ash is variously altered.

$A^1O$ may be constituted from only oxyethylene groups or only oxypropylene groups, but may include both oxyethylene groups and oxypropylene groups. In such cases, the oxyethylene groups and oxypropylene groups may be added in a random pattern or a block-like pattern.

In addition, in view of the stability over time of the fluidity of the hydraulic composition (the flow retention rate) when the degree of replacement of cement by fly ash is increased, the number of added moles of oxypropylene groups relative to the overall number of added moles of oxyalkylene groups is preferably 10% or more, and more preferably 50% or more.

Meanwhile, in view of the one-pack stability when combined with a water-reducing agent, a preferred admixture mode is one in which the number of added moles of oxyethylene groups relative to the overall number of added moles of oxyalkylene groups is 20% or more.

In the formula above, m denotes an integer between 1 and 3, that is, a compound represented by formula (1) is a phosphate monoester or a salt thereof when m=1, a phosphate diester or a salt thereof when m=2, and a phosphate triester or a salt thereof when m=3.

In addition, M denotes a hydrogen atom, an alkali metal atom, a group II metal atom, an ammonium group, or an organic ammonium group.

Examples of the alkali metal atom include sodium and potassium, and examples of the group II metal atom include calcium and magnesium. In addition, examples of the organic ammonium group include alkyl ammonium groups and alkanol ammonium groups.

Examples of ester compounds having structures represented by formula (1) include compounds represented by the formulae given below. In these formulae, $R^1$, $A^1O$, n and M are as defined above for formula (1).

Phosphate monoesters and salts thereof [m=1]

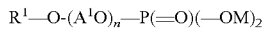

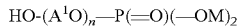

Phosphate diesters and salts thereof [m=2]

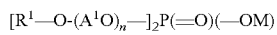

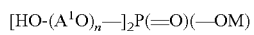

Phosphate triesters and salts thereof [m=3]

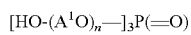

<Glycol Ether Component>

In addition to the carbon blocker having a structure represented by formula (1), the admixture for a hydraulic composition of the present invention may also contain a glycol ether having a structure represented by formula (2) below.

[Chemical Formula 4]

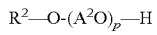
(2)

In the formula above, $R^2$ denotes an alkyl group having 1-5 carbon atoms or an alkenyl group having 2-5 carbon atoms. Here, specific examples of alkyl groups having 1-5 carbon atoms and alkenyl groups having 2-5 carbon atoms are those groups given as examples of $R^1$ above. In addition, in the formula above, $A^2O$ denotes an oxyalkylene group having 2-3 carbon atoms, that is, an oxyethylene group or an oxypropylene group, and p denotes the average number of added moles of the oxyalkylene group $A^2O$, and is 2-150.

In cases where the admixture for a hydraulic composition of the present invention contains a glycol ether having a structure represented by formula (2) above, it is preferable for the carbon blocker having a structure represented by formula (1): glycol ether having a structure represented by formula (2) mass ratio to be between 99:1 and 50:50.

By blending a glycol ether at a maximum content of 50 mass % in the admixture for a hydraulic composition of the present invention, it is possible to improve the appearance of a mortar.

<Water-Reducing Agent>

The water-reducing agent (cement dispersing agent) used in the admixture of the present invention can be a variety of water-reducing agents, such as a high performance AE water-reducing agent, a high performance water-reducing agent, an AE water-reducing agent or a water-reducing agent. Examples of publicly known water-reducing agents (cement dispersing agents) include polycarboxylic acid-based copolymer salts such as those disclosed in Japanese Examined Patent Application Publication Nos. S58-383380 and S59-18338 and Japanese Patent Nos. 2628486, 2774445, 3235002 and 3336456. In addition, examples of water-reducing agents (cement dispersing agents) other than polycarboxylic acid-based copolymers include salts of naphthalene sulfonic acid-formalin condensates, salts of melamine sulfonic acid-formalin condensates, lignin sulfonic acid salts, sodium gluconate and sugar alcohols.

Of these, it is preferable to use at least one type of water-reducing agent selected from among the group consisting of lignin sulfonic acid-based water reducing agents, polycarboxylic acid-based water-reducing agents and naphthalene sulfonic acid-based water-reducing agents.

In the admixture of the present invention, the blending ratio of the carbon blocker and the water-reducing agent is, for example, a carbon blocker:water-reducing agent mass ratio of 0.01:99.99 to 50:50, and preferably 0.01:99.99 to 30:70.

<Anti-Foaming Agent>

The admixture of the present invention may further contain an anti-foaming agent. Examples of anti-foaming agents include non-ionic anti-foaming agents, such as alkylene oxide adducts of aliphatic alcohols, fatty acid esters of alkylene oxide adducts of aliphatic alcohols, alkylene oxide adducts of fatty acids, alkylene oxide fatty acid diesters, alkylene oxide adducts of polyhydric alcohols and alkylene oxide adducts of polyalkylene-polyamines; silicone-based anti-foaming agents in which silicone oils are emulsified; higher alcohol compounds in which higher alcohols are emulsified; and mixtures comprising the aforementioned compounds as primary components.

In the admixture of the present invention, the blending ratio of the carbon blocker and an anti-foaming agent is, for example, a carbon blocker:anti-foaming agent mass ratio of 99.99:0.01 to 50:50.

<Air Entraining Agent>

The admixture of the present invention may further contain an air entraining agent (an AE agent). By being blended together with an air entraining agent, the carbon blocker has the role of enhancing the air entraining effect of the air entraining agent.

Air entraining agents able to be used are not particularly limited as long as a conventional already-known air entraining agent is used, and specific examples thereof include <1> anionic air entraining agents, <2> non-ionic air entraining agents and <3> amphoteric air entraining agents. Examples of <1> anionic air entraining agents include sulfate ester salts of higher alcohols (and alkylene oxide adducts thereof), alkylbenzene sulfonate salts, resin soap salts such as rosin soaps, and phosphate ester salts of higher alcohols (and alkylene oxide adducts thereof), examples of <2> non-ionic air entraining agents include alkylene glycols, alkylene oxide adducts of higher alcohols, esters of fatty acids and alkylene glycols, and alkylene glycol adducts of sugar alcohols, and examples of <3> amphoteric air entraining agents comprising anions and cations include alkyl betaine type, alkylamide betaine type and amino acid-based amphoteric surfactant type air entraining agents.

Of these, anionic air entraining agents such as polyoxyethylene alkyl ether sulfates can be advantageously used.

In the admixture of the present invention, the blending ratio of the carbon blocker and an air entraining agent is, for example, a carbon blocker:air entraining agent mass ratio of 0.01:99.99 to 99.99:0.01, and preferably 20:80 to 99.9:0.1.

Therefore, the present invention relates to an admixture for a hydraulic composition, which contains a carbon blocker and a water-reducing agent, which may further contain an anti-foaming agent and an air entraining agent, and which contains these components in a single pack.

The admixture of the present invention may, as appropriate, be used in combination with publicly known and commonly used chemical admixtures and the like. Specifically, it is possible to blend concrete additives other than those mentioned above, for example, at least one other type of concrete additive selected from among the group consisting of foaming agents, curing agents, water-repelling agents, setting accelerators and setting retarders.

The admixture of the present invention includes single pack admixtures comprising the carbon blocker and water-reducing agent mentioned above, and also includes modes obtained by further blending publicly known concrete additives, such as anti-foaming agents and air entraining agents, in the admixture.

Among chemical admixtures able to be used in the admixture of the present invention, examples of setting accelerators include inorganic accelerators such as calcium chloride and calcium nitrite, and organic accelerators such as alkanolamines.

In addition, examples of setting retarders include <1> inorganic setting retarders, such as phosphates, silicofluorides, zinc oxide, zinc carbonate, zinc chloride, zinc monoxide, copper hydroxide, magnesia salts, borax and boron oxide, and <2> organic setting retarders, such as phosphonic acid derivatives, sugars and derivatives thereof, oxycarboxylic acid salts and lignin sulfonic acid salts, and more specific examples thereof include phosphonic acid derivatives, such as amino-tri(methylenephosphonic acid), pentasodium amino-tri(methylenephosphonate), 1-hydroxyethylidene-1,1-diphosphonic acid, diethylenetriamine-penta (methylenephosphonic acid), and phosphonic acid alkali metal salts and alkaline earth metal salts and derivatives thereof; sugars, such as saccharose, maltose, raffinose, lactose, glucose, fructose, mannose, arabinose, xylose, abitose and ribose; oxycarboxylic acid salts, such as gluconic acid, citric acid, glucoheptonic acid, malic acid, tartaric acid and alkali metal salts and alkaline earth metal salts of these acids.

The admixture of the present invention, which contains a carbon blocker and a water-reducing agent, exhibits the effect of enhancing the excellent air entraining effect of, in particular, a hydraulic composition having fly ash blended therein, in which some cement in the hydraulic composition is replaced by fly ash. Components that constitute this hydraulic composition are components for conventional commonly used concrete, examples of which include cement, such as ordinary Portland cement, quick hardening Portland cement, ultraquick hardening Portland cement, low heat/moderate heat Portland cement and Portland blast furnace cement, aggregates, such as fine aggregate and coarse aggregate, admixtures, such as silica fume, powdered calcium carbonate, finely powdered blast furnace slag and fly ash, expansive materials, and water.

This fly ash can be type I to type IV fly ash specified in JIS A6201 as types of fly ash for concrete, and also other types of fly ash not specified by JIS.

That is, the admixture of the present invention can exhibit a performance-enhancing effect for types of fly ash having differing qualities in terms of a variety of items specified in JIS specifications, for example, an ignition loss (%), which is an indicator of unburned carbon content, of 8.0 or lower, a silicon dioxide content (%) of 45.0 or higher, and a variety of numerical ranges that reflect the quality of fly ash, such as methylene blue adsorption and BET specific surface area.

A hydraulic composition for which the present invention is to be used preferably has a degree of replacement of cement by fly ash (in terms of mass) of greater than 0% and not greater than 80%, and more preferably greater than 0% and not greater than 50%.

In the admixture of the present invention, the mass of the carbon blocker is preferably 0.0001-5.0 mass %, the mass of the water-reducing agent is preferably 0.1-10.0 mass %, the mass of the anti-foaming agent is preferably 0.0001-1.0 mass % and the mass of the air entraining agent is preferably 0.0001-1.0 mass %, each relative to the mass of cement or the total mass of cement and fly ash in the hydraulic composition. Moreover, these numerical ranges can be altered according to the components that constitute the hydraulic composition, for example according to the quality of cement, fine aggregate, coarse aggregate, fly ash, and the like.

The admixture of the present invention exhibits an excellent air entrainment enhancement effect and excellent one-pack stability and compatibility, and also exhibits excellent compatibility with water. That is, the admixture of the present invention can be used for types of concrete having different strengths and water/powder ratios (mass percentages) of 60-15%, which represents the proportion of water relative to cement or cement and fly ash (powders). Moreover, in the present specification, powder means cement alone or a combination of cement and fly ash.

The admixture of the present invention can be added after mixing concrete or mortar (immediately before placement), but can also be added when mixing concrete or added after being diluted in advance with mixing water.

Working Examples

The present invention will now be explained through the use of working examples. However, the present invention is in no way limited to these working examples and comparative examples.

[Preparation of Carbon Blockers (CB) A1 to A3]

3 moles of a block adduct of propylene oxide (5 moles) and ethylene oxide (2 moles) to methanol was placed in a glass reaction vessel fitted with a stirrer, a temperature gauge and a nitrogen inlet tube, 1 mole of phosphoric anhydride was added to the reaction vessel over a period of 4 hours at 50° C. while bubbling nitrogen, and a reaction was allowed to progress. Next, an aging reaction was carried out for 3 hours at 100° C., a phosphoric acid esterification reaction was concluded, and compound A1 (a carbon blocker (CB)) [phosphate monoester:diester:triester molar ratio 50:45:5] was obtained.

Compounds A2 and A3 (carbon blockers) were obtained using the same procedure, except that the phosphoric acid esterification reaction was carried out using a block adduct of ethylene oxide (45 moles) and propylene oxide (5 moles) to isopentenyl alcohol or an adduct of propylene oxide (10 moles) to methacrylic acid instead of the adduct of alkylene oxide to methanol. Moreover, the details of the obtained carbon blockers A1 to A3 are shown in Table 1.

[Preparation of Glycol Ether B1]

In addition, polyethylene/polypropylene glycol monomethyl ether (a compound obtained by block addition of propylene oxide (5 moles) and ethylene oxide (2 moles) to 1 mole of methanol) was used as a glycol ether represented by formula (2), as shown in Table 2.

TABLE 1

| [$R^1$—O—($A^1$O)$_n$]-(phosphate ester) | | | |
|---|---|---|---|
| | $R^1$ | $A^1$O:n | Phosphate ester (mol. %) |
| A1 | Methyl group | PO/EO:5/2 | Monoester:diester:triester = 50:45:5 |
| A2 | C5 alkenyl group*[1] | EO/PO:45/5 | Monoester:diester:triester = 50:45:5 |
| A3 | Methacryloyl group | PO:10 | Monoester:diester:triester = 50:45:5 |

*[1] C5 alkenyl group: $H_2C{=}C(CH_3)-CH_2CH_2-$

TABLE 2

| $R^2$—O—($A^2$O)$_p$—H (2) | |
|---|---|
| $R^2$ | $A^2$O:p |
| B1 Methyl group | PO/EO:5/2 |

The [1. One-pack stability confirmation test] and [2. Fresh mortar test] were carried out using compounds A1 to A3 as carbon blockers (CB) A1 to A3 and a mixture obtained by mixing compound A1 and glycol ether B1 at a mass ratio of 1:1 as carbon blocker (CB) A4. Moreover, in the tests below, the usage quantities of carbon blockers A1 to A4 are quantities calculated in terms of solid content (effective quantities).

[Test 1. One-Pack Stability Confirmation Test]

Carbon blockers A1 to A4, which were prepared in the manner described above, and an AE water-reducing agent (Sikament J, manufactured by Sika Ltd, density 1.05 g/cm$^3$) were mixed at an AE water-reducing agent: carbon blocker ratio of 98 mass %:2 mass %. In addition, an AE water-reducing agent was mixed with an oleyl-7EO-phosphate ester (monoester/diester molar ratio=50/50) (Comparative Example 2) or ethylene glycol monophenyl ether (Comparative Example 3) instead of the carbon blockers mentioned above.

After mixing, each mixture was allowed to stand for 1 day at 20° C., the appearance of each mixture was confirmed by eye immediately after mixing and 1 day thereafter, from which the one-pack stability was evaluated. Moreover, appearance was evaluated in the manner described below. The obtained results are shown in Table 4.

<Appearance Evaluation>

Transparent: The liquid had a transparent appearance (there was sufficient miscibility between the carbon blocker (or carbon blocker replacement compound) and the AE water-reducing agent).

Turbid: The liquid had a turbid appearance, but a stable appearance was maintained and separation had not occurred.

Separated: The carbon blocker (or carbon blocker replacement compound) and the AE water-reducing agent had completely separated.

[Test 2. Fresh Mortar Test]

In accordance with JIS R 5201, fresh mortar tests were carried out using types of mortar in which the degree of replacement by fly ash (FA) was variously altered.

More specifically, using carbon blockers A1 to A4 (quantity added to cement or mixture of cement and fly ash: 0.02 mass %), an AE water-reducing agent as a water-reducing agent (Sikament J, manufactured by Sika Ltd, anti-foaming agent mixture, density 1.055 g/cm³) (quantity added relative to mass of cement or total mass of mixture of cement and fly ash: 1.0 mass % (wet usage quantity)), Sika AER-50 (manufactured by Sika Ltd, polyoxyethylene alkyl ether sulfate, density 1.065 g/cm³) (quantity added relative to mass of cement or total mass of mixture of cement and fly ash: quantities shown in Table 4 (wet usage quantity)) as an AE agent (air entraining agent) as components of the admixture of the present invention, mixing water prepared by adding these components in advance was added to cement or a mixture of cement, fly ash and fine aggregate, mixed at low speed for 90 seconds using a high power mixer (manufactured by Maruto Testing Machine Company), and the obtained mixture was allowed to rest for 30 seconds. 20 seconds after the start of resting, mortar that had adhered to the sides of the container was scraped off, and following completion of the resting period, the mortar was mixed at high speed for 90 seconds so as to obtain a test mortar. Moreover, the unit quantities of mortar materials used in the test are shown in Table 3.

In addition, comparative example test mortars were prepared using the same procedure, except that a carbon blocker was not blended (Comparative Example 1), 0.02 mass % of an oleyl-7EO-phosphate ester (monoester/diester molar ratio=50/50) was blended instead of the carbon blockers mentioned above (Comparative Example 2), and 0.02 mass % of ethylene glycol monophenyl ether was blended instead of the carbon blockers mentioned above (Comparative Example 3).

TABLE 3

Mortar formulations

| Formulation No. | Water/powder ratio W/B (%) | FA replacement rate (%) | Unit quantities (g) | | | |
|---|---|---|---|---|---|---|
| | | | Water (W) | Cement (C) | Fly ash (FA) | Fine aggregate (S) |
| 1 | 44.9 | 0 | 323 | 720 | — | 1653 |
| 2 | 44.9 | 10 | 323 | 648 | 72 | 1653 |
| 3 | 44.9 | 20 | 323 | 576 | 144 | 1653 |
| 4 | 44.9 | 30 | 323 | 504 | 216 | 1653 |

W/B: Proportion of water (g) relative to total quantity of cement and fly ash (g)
Water (W): Mains water
Cement (C): Ordinary Portland cement (density 3.15 g/cm³)
Fly ash (FA): Type II fly ash (density 2.16 g/cm³, specific surface area 3960 cm²/g, silicon dioxide content 54.1%, moisture content <0.1%, ignition loss 3.8%, 45 μm sieve residue 5%, flow value ratio 109%, activity coefficient 89% after 28 days and 99% after 91 days, methylene blue (MB) adsorption 0.92 mg/g)
Fine aggregate (S): Inland sand (dry density 2.64 g/cm³, coarse particle ratio (F. M. = 2.78) from Futtsu, Chiba Prefecture, Japan These mortars were measured in terms of mortar spreading (mini slump flow) immediately after mixing and 30 minutes thereafter, using a mini slump cone (upper internal diameter 50 mm, lower internal diameter 100 mm, height 150 mm) in accordance with JIS A 1171 "Polymer cement mortar test methods".

Following the mini slump flow measurements, the state of the mortar was confirmed by eye according to the criteria given below.

<Evaluation of Mortar State>
⊚ The mortar surface was shiny, with almost no surface bubbles visible.
○ The mortar surface was shiny, but a few surface bubbles were visible.
Δ The mortar surface was rough.

In addition, the volume of air in the mortar was calculated immediately after mixing and 30 minutes thereafter. A total mass method was used for the air volume measurements, and air volume values were calculated using the following formula from results measured using a measuring cylinder.

Air volume (%)={1−[(mass of mortar immediately after mixing or 30 minutes thereafter(measured quantity))/(mass of mortar having an air volume of 0%, as calculated from the formulation measured above)]}×100

Moreover, the components in the admixture of the present invention, that is, chemical agents including the carbon blocker, AE water-reducing agent and AE agent, were each measured out as a part of the water and used in the test.

The obtained results are shown in Table 4 and Table 5.

TABLE 4

Results of one-pack stability tests and fresh mortar test (1)

| | FA replacement rate (%) | AE agent BX % | Mini slump flow (mm) | | Air volume (%) | | State of mortar | Water-reducing agent one-pack stability | |
|---|---|---|---|---|---|---|---|---|---|
| | | | Immediate | 30 mins | Immediate | After 30 mins | | Immediate | After 1 day |
| Working Example 1 A1 | 0 | 0.0005 | 183 | 166 | 11.0 | 10.1 | ○ | Transparent | Transparent |
| | 10 | 0.0040 | 182 | 166 | 10.6 | 9.4 | ○ | | |
| | 20 | 0.0120 | 177 | 161 | 10.7 | 9.4 | ○ | | |
| | 30 | 0.0200 | 161 | 145 | 10.2 | 8.9 | ○ | | |
| Working Example 3 A2 | 0 | 0.0005 | 186 | 168 | 11.0 | 10.1 | ○ | Transparent | Transparent |
| | 10 | 0.0070 | 184 | 167 | 10.6 | 9.3 | ○ | | |
| | 20 | 0.0180 | 181 | 163 | 10.7 | 9.3 | ○ | | |
| | 30 | 0.0300 | 165 | 146 | 10.4 | 9 | ○ | | |
| Working Example 4 A3 | 0 | 0.0005 | 188 | 170 | 10.6 | 9.7 | ○ | Turbid | Turbid |
| | 10 | 0.0040 | 185 | 166 | 10.4 | 9.1 | ○ | | |
| | 20 | 0.0120 | 183 | 162 | 10.2 | 8.8 | ○ | | |
| | 30 | 0.0220 | 167 | 144 | 10.3 | 8.9 | ○ | | |

TABLE 4-continued

Results of one-pack stability tests and fresh mortar test (1)

| | FA replacement rate (%) | AE agent BX % | Mini slump flow (mm) Immediate | Mini slump flow (mm) After 30 mins | Air volume (%) Immediate | Air volume (%) After 30 mins | State of mortar | Water-reducing agent one-pack stability Immediate | Water-reducing agent one-pack stability After 1 day |
|---|---|---|---|---|---|---|---|---|---|
| Working Example 4 A4 (A1 + B1) | 0 | 0.0005 | 178 | 162 | 11.0 | 10.1 | ◉ | Transparent | Transparent |
| | 10 | 0.0055 | 177 | 159 | 10.4 | 9.6 | ◉ | | |
| | 20 | 0.0136 | 173 | 153 | 10.6 | 9.7 | ◉ | | |
| | 30 | 0.0230 | 159 | 138 | 10.3 | 9.2 | ○ | | |

TABLE 5

Results of one-pack stability tests and fresh mortar test (2)

| | FA replacement rate (%) | AE agent BX % | Mini slump flow (mm) Immediate | Mini slump flow (mm) After 30 mins | Air volume (%) Immediate | Air volume (%) After 30 mins | State of mortar | Water-reducing agent one-pack stability Immediate | Water-reducing agent one-pack stability After 1 day |
|---|---|---|---|---|---|---|---|---|---|
| Comparative Example 1* (None) | 0 | 0.0010 | 185 | 166 | 10.9 | 9.8 | ○ | — | — |
| | 10 | 0.0100 | 178 | 157 | 10.7 | 9.1 | Δ | | |
| | 20 | 0.0250 | 168 | 145 | 10.6 | 8.8 | Δ | | |
| | 30 | 0.0400 | 154 | 129 | 10.3 | 8.5 | Δ | | |
| Comparative Example 2* | 0 | 0.0005 | 185 | | 18.8*[1] | | | Turbid | Separated |
| Comparative Example 3* | 0 | 0.0005 | 174 | — | 17.4*[1] | — | | Turbid | Separated |

*Comparative Example 1: Carbon blockers A1 to A4 not blended
*Comparative Example 2: Oleyl-7EO-phosphate ester (monoester/diester molar ratio = 50/50) blended at a proportion of 0.02 mass % relative to the cement instead of carbon blockers A1 to A4
*Comparative Example 3: Ethylene glycol monophenyl ether blended at a proportion of 0.02 mass % relative to the cement instead of carbon blockers A1 to A4
*[1]Not suitable for use as a carbon blocker due to the air entrainment properties being excessive even at a FA replacement rate of 0%

As shown in Table 4 and Table 5, Working Examples 1 to 4, which used carbon blockers A1 to A4 as admixture components, achieved the effect of being able to maintain an almost constant air volume while greatly reducing the usage quantity of air entraining agent (AE agent) compared to Comparative Example 1, in which these carbon blockers were not used.

In addition, Working Examples 1 to 4 exhibited excellent one-pack stability between the carbon blocker and the water-reducing agent and produced an excellent mortar appearance, and Working Example 4 in particular, in which glycol ether B1 was also used, achieved the effect of being able to achieve a particularly excellent mortar appearance.

Meanwhile, Comparative Example 2, in which an oleyl-7EO-phosphate ester was used instead of these carbon blockers, and Comparative Example 3, in which ethylene glycol monophenyl ether was used instead of these carbon blockers, exhibited excessive air entrainment even when blended in a mortar having a degree of fly ash replacement of 0%, and had the effect of worsening, rather than enhancing, the effect of adjusting the quantity of air entrained.

[Test 3. Fresh Concrete Test]

The fresh concrete test explained below was carried out using types of concrete in which the type of fly ash and the type of water-reducing agent used in the admixture were altered.

Concrete mixing was carried out using a 55 liter forced two-shaft mixer, coarse aggregate, fine aggregate, cement and mixing water (containing carbon blocker (CB) A1, a water-reducing agent and an air entraining agent (AE agent)) were introduced into the mixer, mixed for 90 seconds and then discharged.

Next, the obtained mixture was subjected to the following fresh concrete tests: slump test (JIS A 1101), slump flow test (JIS A 1150), air volume test (JIS A 1101) and concrete temperature measurement (JIS A 1156), immediately after concrete discharge and 30 minutes and 60 minutes thereafter. Moreover, the air volume test carried out immediately after concrete discharge was carried out (approximately 3 minutes) after the slump test in order to exclude entrained air. In addition, the concrete was allowed to rest in a mixing vessel over time, and the fresh concrete tests mentioned above were repeated at prescribed intervals.

[Materials Used]

The following materials were used in the fresh concrete tests.

Cement (C): Ordinary Portland cement (manufactured by Taiheiyo Cement Corporation, density 3.16 g/cm$^3$)

Fly ash (FA): The characteristics of the fly ash used in the fresh concrete tests are shown in Table 6. Fly ash conforming to JIS (JIS A6201) and fly ash not conforming to JIS, which had different values for ignition loss (an indicator of unburned carbon content), were used.

TABLE 6

Characteristics of types of fly ash used

| FA type | Classification | Ignition loss (%) | MB adsorption (mg/g) | Density (g/cm³) |
|---|---|---|---|---|
| FA-1 | Crude ash | 5.4 | 1.47 | 2.33 |
| FA-2 | Crude ash | 3.9 | 0.91 | 2.32 |
| FA-3 | Type I | 1.9 | 0.26 | 2.40 |

Fine aggregate (S): Inland sand from Futtsu, Chiba Prefecture, Japan (density 2.64 g/cm³)

Coarse aggregate (G): Crushed limestone from Garo, Hokkaido Prefecture, Japan (density 2.70 g/cm³)

Water (W): Mains water

Water-reducing agent (Ad)

AE water-reducing agent (Lig): Sikament JS (manufactured by Sika Ltd., lignin-based AS water-reducing agent, density 1.081 g/cm³, combined with anti-foaming agent)

High performance AS water-reducing agent (PCE): Sikament 1100NT (manufactured by Sika Ltd., polycarboxylic acid-based high performance AS water-reducing agent, density 1.065 g/cm³, combined with anti-foaming agent)

High performance water-reducing agent (NFS): Sikament S (manufactured by Sika Ltd., naphthalene-based high performance water-reducing agent, density 1.200 g/cm³, not combined with anti-foaming agent)

AE agent (AE): Sika AER-50 (manufactured by Sika Ltd., polyoxyethylene alkyl ether sulfate, density 1.065 g/cm³)

Carbon blocker (CB): Carbon blocker A1 (see Table 1)

[Concrete Formulations and Fresh Concrete Test Results]

Concrete formulations are shown in Table 7. In formulations in which the AE water-reducing agent (Lig) was used, the target slump was 18±2.5 cm and the target air volume was 4.5±1.5%, but in formulations in which the high performance AE water-reducing agent (PCE) or high performance water-reducing agent (NFS) was used, the target slump was 21±2 cm and the target air volume was 4.5±1.5%.

In addition, these formulations were tested as formulations that did not contain fly ash and formulations that contained fly ash at an internal ratio of 30% relative to the quantity of cement. The fresh concrete test results are shown in Tables 8 to 10.

TABLE 7

Concrete formulations

| No. | Ad Type | Ad Added quantity (BX %) | AE Added quantity (BX %) | CB Added quantity (BX %) | W/B (%) | S/a (%) | W | C | FA1 | FA2 | FA3 | S | G |
|---|---|---|---|---|---|---|---|---|---|---|---|---|---|
| Working Example 5 | Lig | 0.8 | — | 0.0003 | 54.7 | 46.5 | 175 | 320 | | | | 834 | 980 |
| Working Example 6 | Lig | 0.8 | 0.050 | 0.030 | 54.7 | 46.5 | 170 | 218 | 93 | | | 829 | 977 |
| Working Example 7 | Lig | 0.8 | 0.015 | 0.060 | 54.7 | 46.5 | 170 | 218 | 93 | | | 829 | 977 |
| Working Example 8 | Lig | 0.8 | 0.003 | 0.090 | 54.7 | 46.5 | 170 | 218 | 93 | | | 829 | 977 |
| Working Example 9 | Lig | 0.8 | 0.005 | 0.006 | 54.7 | 46.5 | 153 | 196 | | | 84 | 865 | 1018 |
| Working Example 10 | Lig | 0.8 | 0.003 | 0.009 | 54.7 | 46.5 | 153 | 196 | | | 84 | 865 | 1018 |
| Working Example 11 | Lig | 0.8 | 0.003 | 0.012 | 54.7 | 46.5 | 153 | 196 | | | 84 | 865 | 1018 |
| Working Example 12 | PCE | 1.0 | 0.004 | 0.0002 | 37.8 | 47.1 | 170 | 450 | | | | 799 | 918 |
| Working Example 13 | PCE | 1.0 | 0.007 | 0.030 | 37.8 | 47.1 | 165 | 306 | | 131 | | 792 | 909 |
| Working Example 14 | PCE | 1.0 | 0.004 | 0.060 | 37.8 | 47.1 | 165 | 306 | | 131 | | 792 | 909 |
| Working Example 15 | PCE | 1.0 | 0.004 | 0.090 | 37.8 | 47.1 | 165 | 306 | | 131 | | 792 | 909 |
| Working Example 16 | NFS | 1.5 | 0.030 | 0.0002 | 37.8 | 47.1 | 170 | 450 | | | | 799 | 918 |
| Working Example 17 | NFS | 1.35 | 0.050 | 0.030 | 37.8 | 47.1 | 165 | 306 | | 131 | | 792 | 909 |
| Working Example 18 | NFS | 1.35 | 0.030 | 0.060 | 37.8 | 47.1 | 165 | 306 | | 131 | | 792 | 909 |
| Working Example 19 | NFS | 1.35 | 0.030 | 0.090 | 37.8 | 47.1 | 165 | 306 | | 131 | | 792 | 909 |
| Comparative Example 4 | Lig | 0.8 | — | 0 | 54.7 | 46.5 | 175 | 320 | | | | 834 | 980 |
| Comparative Example 5 | Lig | 0.8 | 0.110 | 0 | 54.7 | 46.5 | 170 | 218 | 93 | | | 829 | 977 |
| Comparative Example 6 | Lig | 0.8 | 0.014 | 0 | 54.7 | 46.5 | 153 | 196 | | | 84 | 865 | 1018 |
| Comparative Example 7 | PCE | 1.0 | 0.004 | 0 | 37.8 | 47.1 | 170 | 450 | | | | 799 | 918 |
| Comparative Example 8 | PCE | 1.0 | 0.015 | 0 | 7 | 47.1 | 165 | 306 | | 131 | | 792 | 909 |

TABLE 7-continued

Concrete formulations

| | | Ad | AE | CB | | | | | | | | |
|---|---|---|---|---|---|---|---|---|---|---|---|---|
| | | Added quantity | Added quantity | Added quantity | W/B | S/a | \multicolumn{6}{c}{Unit quantities (kg/m³)} |
| No. | Type | (BX %) | (BX %) | (BX %) | (%) | (%) | W | C | FA1 | FA2 | FA3 | S | G |
| Comparative Example 9 | NFS | 1.5 | 0.030 | 0 | 37.8 | 47.1 | 170 | 450 | | | | 799 | 918 |
| Comparative Example 10 | NFS | 1.35 | 0.070 | 0 | 37.8 | 47.1 | 165 | 306 | | 131 | | 792 | 909 |

W/B: Water/powder ratio [B: cement + fly ash (fly ash content 30 mass %)]
s/a: Fine aggregate ratio

TABLE 8

Fresh concrete test results (1)

| | Minutes | Slump (cm) | Slump flow (cm) | Air volume (%) | Concrete temperature (° C.) |
|---|---|---|---|---|---|
| Working Example 5 | 0 | 19.0 | 32.0 | 3.5 | 21 |
| | 30 | 15.5 | 26.3 | 3.2 | 21 |
| | 60 | 11.0 | 22.8 | 2.8 | 21 |
| Working Example 6 | 0 | 17.5 | 29.3 | 4.9 | 22 |
| | 30 | 11.5 | 23.3 | 3.3 | 22 |
| | 60 | 8.0 | 21.0 | 1.8 | 22 |
| Working Example 7 | 0 | 19.0 | 31.5 | 5.2 | 21 |
| | 30 | 14.0 | 25.5 | 3.2 | 22 |
| | 60 | 9.5 | 22.3 | 2.3 | 22 |
| Working Example 8 | 0 | 20.0 | 33.5 | 4.3 | 20 |
| | 30 | 16.0 | 27.3 | 2.9 | 21 |
| | 60 | 13.5 | 25.3 | 2.8 | 20 |
| Working Example 9 | 0 | 18.5 | 30.8 | 4.4 | 20 |
| | 30 | 14.0 | 23.8 | 3.5 | 20 |
| | 60 | 11.5 | 22.3 | 2.9 | 20 |
| Working Example 10 | 0 | 18.0 | 29.3 | 4.2 | 20 |
| | 30 | 13.0 | 24.5 | 3.4 | 21 |
| | 60 | 9.0 | 21.5 | 2.6 | 20 |
| Working Example 11 | 0 | 19.0 | 29.3 | 4.4 | 21 |
| | 30 | 15.0 | 25.8 | 3.6 | 21 |
| | 60 | 10.5 | 23.3 | 3.3 | 21 |
| Working Example 12 | 0 | 22.5 | 37.5 | 5.2 | 20 |
| | 30 | 19.0 | 28.5 | 4.6 | 20 |
| | 60 | 11.5 | 22.3 | 4.0 | 20 |

TABLE 9

Fresh concrete test results (2)

| | Minutes | Slump (cm) | Slump flow (cm) | Air volume (%) | Concrete temperature (° C.) |
|---|---|---|---|---|---|
| Working Example 13 | 0 | 22.5 | 36.8 | 4.1 | 20 |
| | 30 | 13.0 | 23.0 | 3.2 | 20 |
| | 60 | 4.5 | 20.0 | 3.1 | 19 |
| Working Example 14 | 0 | 23.0 | 39.3 | 5.0 | 20 |
| | 30 | 17.5 | 26.8 | 3.8 | 19 |
| | 60 | 7.0 | 20.3 | 3.4 | 19 |
| Working Example 15 | 0 | 22.0 | 35.5 | 5.6 | 20 |
| | 30 | 16.0 | 26.5 | 4.9 | 20 |
| | 60 | 8.0 | 21.0 | 4.3 | 19 |
| Working Example 16 | 0 | 20.0 | 31.5 | 4.5 | 19 |
| | 30 | 6.0 | 20.0 | 3.2 | 19 |
| | 60 | 2.5 | 20.0 | 3.0 | 19 |
| Working Example 17 | 0 | 21.5 | 34.0 | 5.7 | 19 |
| | 30 | 9.0 | 22.0 | 4.7 | 19 |
| | 60 | 3.5 | 20.0 | 4.2 | 19 |
| Working Example 18 | 0 | 20.5 | 32.5 | 5.1 | 19 |
| | 30 | 8.0 | 21.5 | 4.7 | 19 |
| | 60 | 3.5 | 20.0 | 4.5 | 19 |
| Working Example 19 | 0 | 21.0 | 34.0 | 5.7 | 19 |
| | 30 | 9.0 | 21.8 | 5.0 | 19 |
| | 60 | 3.5 | 20.0 | 5.0 | 19 |

TABLE 10

Fresh concrete test results (3)

| | Minutes | Slump (cm) | Slump flow (cm) | Air volume (%) | Concrete temperature (° C.) |
|---|---|---|---|---|---|
| Comparative Example 4 | 0 | 18.5 | 29.3 | 2.5 | 21 |
| | 30 | 14.5 | 24.8 | 2.4 | 21 |
| | 60 | 8.5 | 21.0 | 2.5 | 21 |
| Comparative Example 5 | 0 | 19.0 | 33.0 | 4.7 | 20 |
| | 30 | 14.5 | 25.8 | 2.5 | 21 |
| | 60 | 9.5 | 22.3 | 1.7 | 20 |
| Comparative Example 6 | 0 | 18.5 | 30.3 | 5.5 | 21 |
| | 30 | 12.5 | 24.0 | 3.8 | 21 |
| | 60 | 9.5 | 22.0 | 3.0 | 21 |
| Comparative Example 7 | 0 | 23.0 | 43.8 | 5.7 | 20 |
| | 30 | 20.0 | 30.5 | 5.4 | 20 |
| | 60 | 13.0 | 23.5 | 4.7 | 20 |
| Comparative Example 8 | 0 | 22.5 | 37.0 | 5.9 | 20 |
| | 30 | 13.5 | 24.8 | 4.9 | 20 |
| | 60 | 4.5 | 20.0 | 3.9 | 19 |
| Comparative Example 9 | 0 | 20.0 | 30.8 | 4.8 | 19 |
| | 30 | 6.0 | 21.0 | 3.5 | 19 |
| | 60 | 3.0 | 20.0 | 2.7 | 19 |
| Comparative Example 10 | 0 | 21.5 | 34.5 | 5.7 | 19 |
| | 30 | 7.5 | 21.0 | 3.5 | 19 |
| | 60 | 4.0 | 20.0 | 2.4 | 19 |

As shown in Tables 8 to 10, cases in which the admixture for a hydraulic composition of the present invention contains carbon blocker A1 achieved results that show that air can be stably entrained even when the type of fly ash blended in the hydraulic composition varies, that is, when the content of unburned carbon contained in the fly ash (which is reflected in the ignition loss) varies, regardless of the type of blended water-reducing agent and regardless of the presence or absence of an anti-foaming agent. In particular, the fresh concrete test results shown in Tables 8 and 9 for the admixture for a hydraulic composition of the present invention confirm that by adding a carbon blocker (compound A1) as a component of the admixture, it is possible to greatly reduce the usage quantity of AE agent required to ensure the desired air volume in all of these formulations (see Table 7). In addition, there is no significant difference in terms of the properties of an obtained fresh concrete between cases in which the admixture for a hydraulic composition of the present invention is used (the working examples) and cases in which an admixture not containing a carbon blocker is used, and it was confirmed that the use of the admixture for a hydraulic composition of the present invention has no adverse effect on the properties of fresh concrete.

[Measurement of Compressive Strength and Bubble Spacing Factor in Hardened Test Piece]

Fresh concrete was prepared according to the concrete formulations of Working Examples 5 and 8 and Comparative Examples 4 and 5, and concrete test pieces for compressive strength tests (Ø10×20 cm) were prepared using these prepared fresh concretes, removed from molds the following day, and then cured in water (20±2° C.). The compressive strength and bubble spacing factor of these test pieces for compressive strength tests were measured when the test pieces were 28 days old.

The compressive strength (N/mm$^2$) of these 28 day old test pieces was measured in accordance with JIS A 1108. For the bubble spacing factor (μm) and air volume (%) after hardening, a measurement sample having a thickness of 5 cm was cut from the center part of a test piece, both cut surfaces were polished (#80, 200, 500, 1000, 2000), and cut section bubble structure measurements were carried out in accordance with the linear traverse method in the "measurement methods for parameters and air volume by means of a hardened concrete bubble system using a microscope" in ASTM C457-98, so as to determine the bubble spacing factor and air volume after hardening.

The concrete formulations used for the compressive strength and bubble spacing factor measurements are shown in Table 11, and the measurement results are shown in Table 12.

TABLE 12

Bubble spacing factor measurement results

| No. | Ad type | CB quantity BX % | Post-hardening air volume (%) | Bubble spacing factor (μm) | Compressive strength (N/mm$^2$) |
|---|---|---|---|---|---|
| Working Example 5 | Lig | 0.0003 | 5.1 | 334 | 39.0 |
| Working Example 8 | Lig | 0.090 | 4.4 | 384 | 27.5 |
| Comparative Example 4 | Lig | 0 | 4.2 | 329 | 40.9 |
| Comparative Example 5 | Lig | 0 | 2.9 | 448 | 28.7 |

Table 12 confirms that by having such a formation, the admixture for a hydraulic composition of the composition has no adverse effect on the post-hardening air volume, bubble spacing factor or compressive strength of hardened concrete.

PRIOR ART DOCUMENTS

Patent Documents

Patent Document 1: Japanese Patent Application Publication No. 2005-035872
Patent Document 2: Japanese Patent Application Publication No. H05-24900
Patent Document 3: Japanese Patent Application Publication No. H08-337449
Patent Document 4: Japanese Patent Application Publication No. 2000-086311
Patent Document 5: Japanese Patent Application Publication No. 2006-199953
Patent Document 6: Published Japanese Translation of PCT Application No. 2006-516529

The invention claimed is:

1. An admixture for a hydraulic composition, which contains a carbon blocker including one type of compound selected from the group consisting of phosphate monoesters and salts thereof, phosphate diesters and salts thereof and phosphate triesters and salts thereof, each of which has a structure represented by general formula (1), or a mixture of two or more types thereof; and a water-reducing agent;

TABLE 11

Concrete formulations (reproduced)

| No. | Ad Type | Ad Added quantity (BX %) | AE Added quantity (BX %) | CB Added quantity (BX %) | W/B (%) | S/a (%) | W | C | FA1 | S | G |
|---|---|---|---|---|---|---|---|---|---|---|---|
| Working Example 5 | Lig | 0.8 | — | 0.0003 | 54.7 | 46.5 | 175 | 320 | | 834 | 980 |
| Working Example 8 | Lig | 0.8 | 0.003 | 0.090 | 54.7 | 46.5 | 170 | 218 | 93 | 829 | 977 |
| Comparative Example 4 | Lig | 0.8 | — | 0 | 54.7 | 46.5 | 175 | 320 | | 834 | 980 |
| Comparative Example 5 | Lig | 0.8 | 0.110 | 0 | 54.7 | 46.5 | 170 | 218 | 93 | 829 | 977 |

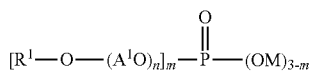

wherein
R$^1$ denotes a hydrogen atom, an alkyl group having 1-5 carbon atoms, an alkenyl group having 2-5 carbon atoms or a (meth)acryloyl group,
A$^1$O denotes an oxyalkylene group having 2-3 carbon atoms,
n denotes the average number of added moles of the oxyalkylene group A$^1$O, and is 2-150,
m denotes an integer between 1 and 3, and
M denotes a hydrogen atom, an alkali metal atom, a group II metal atom, an ammonium group, or an organic ammonium group.

2. The admixture for a hydraulic composition according to claim 1, which further contains a glycol ether having a structure represented by formula (2)

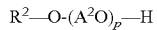

wherein
R$^2$ denotes an alkyl group having 1-5 carbon atoms or an alkenyl group having 2-5 carbon atoms,
A$^2$O denotes an oxyalkylene group having 2-3 carbon atoms, and
p denotes the average number of added moles of the oxyalkylene group A$^2$O, and is 2-150.

3. The admixture for a hydraulic composition according to claim 1, wherein the water-reducing agent includes at least one type selected from the group consisting of lignin sulfonic acid-based water-reducing agents, polycarboxylic acid-based water-reducing agents and naphthalene sulfonic acid-based water-reducing agents.

4. The admixture for a hydraulic composition according to claim 1, which further contains an anti-foaming agent.

5. The admixture for a hydraulic composition according to claim 1, which further contains an air entraining agent.

6. The admixture for a hydraulic composition according to claim 1, which is an admixture for a hydraulic composition having fly ash blended therein.

* * * * *